(12) United States Patent
Zoican-Loebick et al.

(10) Patent No.: US 11,285,463 B1
(45) Date of Patent: Mar. 29, 2022

(54) BIMETALLIC CATALYST FOR CATALYTIC PARTIAL OXIDATION OF HYDROCARBONS

(71) Applicant: Precision Combustion, Inc., North Haven, CT (US)

(72) Inventors: Codruta Maria Zoican-Loebick, North Haven, CT (US); Jeffrey Weissman, Guilford, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 545 days.

(21) Appl. No.: 16/182,681

(22) Filed: Nov. 7, 2018

Related U.S. Application Data (60) Provisional application No. 62/599,059, filed on Dec. 15, 2017.

(51) Int. Cl.
| | | |
|---|---|---|
| *B01J 23/46* | (2006.01) | |
| *B01J 21/04* | (2006.01) | |
| *B01J 35/00* | (2006.01) | |
| *B01J 35/04* | (2006.01) | |
| *B01J 37/02* | (2006.01) | |

(Continued)

(52) U.S. Cl.
CPC .............. *B01J 23/464* (2013.01); *B01J 21/04* (2013.01); *B01J 35/0013* (2013.01); *B01J 35/0066* (2013.01); *B01J 35/04* (2013.01); *B01J 37/0201* (2013.01); *B01J 37/0225* (2013.01); *B01J 37/0236* (2013.01); *B01J 37/0242* (2013.01); *B01J 37/088* (2013.01); *C01B 3/40* (2013.01); *C01B 2203/0261* (2013.01); *C01B 2203/1064* (2013.01); *C01B 2203/1082* (2013.01);

(Continued)

(58) Field of Classification Search
None
See application file for complete search history.

(56) References Cited

U.S. PATENT DOCUMENTS 4,169,862 A * 10/1979 Eden ..................... C07C 17/156
570/223
5,051,241 A *  9/1991 Pfefferle ............ B01D 53/9454
422/180

(Continued)

FOREIGN PATENT DOCUMENTS

EP       0629578 A1    12/1994
EP       0725038 B1     4/2002

(Continued)

OTHER PUBLICATIONS

U.S. Appl. No. 62/566,285 (Specification). (Year: 2017).*

(Continued)

*Primary Examiner* — Paul A Wartalowicz
(74) *Attorney, Agent, or Firm* — Marie Zuckerman; Andrew D. Gathy (57) ABSTRACT

A bimetallic catalyst composition containing a mesh substrate having supported thereon an alumina washcoat on which are impregnated bimetallic particles of rhodium and ruthenium in specified amounts. A process for the catalytic partial oxidation of a hydrocarbon, such as methane or natural gas, involving contacting the hydrocarbon with an oxidant in the presence of the aforementioned bimetallic catalyst under reaction conditions sufficient to produce synthesis gas, that is, to a mixture of hydrogen and carbon monoxide.

13 Claims, 7 Drawing Sheets

(51) Int. Cl.
*B01J 37/08* (2006.01)
*C01B 3/40* (2006.01)

(52) U.S. Cl.
CPC ............. *C01B 2203/1247* (2013.01); *C01B 2203/1252* (2013.01)

(56) References Cited

U.S. PATENT DOCUMENTS

| | | | |
|---|---|---|---|
| 5,149,464 | A | 9/1992 | Green |
| 5,223,631 | A | 6/1993 | Cheng |
| 6,156,444 | A | 12/2000 | Smith |
| 6,328,936 | B1 | 12/2001 | Roychoudhury |
| 6,458,334 | B1 | 10/2002 | Tamhankar |
| 7,001,574 | B2 | 2/2006 | Harford |
| 7,141,092 | B1 | 11/2006 | Roychoudhury |
| 7,504,047 | B2 | 3/2009 | Castaldi |
| 8,795,398 | B2 | 8/2014 | Roychoudhury |
| 8,986,637 | B2 | 3/2015 | Fisher |
| 2005/0112047 | A1 | 5/2005 | Allison |
| 2005/0164139 | A1* | 7/2005 | Valentine ............... C10L 10/02 431/4 |
| 2008/0128655 | A1* | 6/2008 | Garg ...................... B01J 8/008 252/373 |
| 2009/0252661 | A1* | 10/2009 | Roychoudhury ...... B01J 8/0492 422/212 |
| 2011/0200915 | A1* | 8/2011 | Goto ...................... H01M 4/92 429/524 |
| 2011/0296759 | A1* | 12/2011 | Roychoudhury ......... C01B 3/38 48/89 |
| 2013/0072722 | A1* | 3/2013 | Bishop .................. B01J 31/26 564/417 |
| 2014/0017583 | A1 | 1/2014 | Roychoudhury |
| 2020/0254432 | A1* | 8/2020 | Shirman ................. B01J 23/38 |

FOREIGN PATENT DOCUMENTS

| | | |
|---|---|---|
| WO | WO9211199 A1 | 7/1992 |
| WO | WO2004060546 A2 | 7/2004 |

OTHER PUBLICATIONS

U.S. Appl. No. 62/566,285 (Appendix). (Year: 2017).*
A Vita G. Cristiano, C. Italiano, S. Specchia F. Cipiti and V. Specchia "Methane oxy-steam reforming reaction: Performances of Ru/$\gamma$-A/2O3 catalysts loaded on structured cordierite monoliths," International Journal of Hydrogen Energy, 39 (2014), pp. 18592-18603.
S. A. Al-Sayari, "Recent Developments in the Partial Oxidation of Methane to Syngas," The Open Catalysis Journal, 2013, 6, pp. 17-28.
M. Lyubovsky, S. Roychoudhury and R. Lapierre, "Catalytic partial 'oxidation of methane to syngas' at elevated pressures," Catalysis Letters, vol. 99, (2005), pp. 113-117.

* cited by examiner

FIG. 7

BIMETALLIC CATALYST FOR CATALYTIC PARTIAL OXIDATION OF HYDROCARBONS

CROSS-REFERENCE TO RELATED APPLICATION

This application claims benefit of U.S. Provisional Patent Application No. 62/599,059, filed Dec. 15, 2017.

FIELD OF THE INVENTION

This invention pertains to a bimetallic catalyst composition containing rhodium (Rh) and ruthenium (Ru). Additionally, this invention pertains to employing the bimetallic catalyst composition in a process of catalytic partial oxidation of hydrocarbons.

BACKGROUND OF THE INVENTION

Hydrogen is required in sufficient capacity to support industrial fuel cell applications and Fischer-Tropsch (F-T) processes. The latter refer to processes wherein a mixture of hydrogen and carbon monoxide, known as "synthesis gas", is converted to value added chemicals, such as alcohols or hydrocarbons. Natural gas reforming provides an important pathway to hydrogen and synthesis gas. Two reforming pathways are recognized: (1) catalytic partial oxidation (CPOX) of natural gas by oxygen, and (2) steam reforming (SR) of natural gas by water. CPOX processes produce a significant exotherm thereby reducing a need for external heat; whereas SR processes are endothermic and require an input of heat. By comparison with steam reforming, CPOX produces an accelerated rate of reaction, high conversion and high selectivity while employing a smaller reactor and decreased energy consumption. As a disadvantage, however, CPOX processes may suffer from excessive temperatures leading to catalyst degradation, unacceptable coke formation, and low reactor residence times. Moreover, present day commercial catalysts, such as nickel catalysts, exhibit a low tolerance to sulfur-containing compounds that are present in natural gas and other hydrocarbon fuels.

Rhodium is a high performance catalyst for the catalytic partial oxidation of natural gas. As compared with nickel, rhodium is more robust and durable on exposure to high temperatures and sulfur, while providing high rates of reaction and high conversion and selectivity. Rhodium, however, is prohibitively expensive.

In view of the above, it would be beneficial to discover a novel, durable, and more cost effective catalyst that exhibits at least equivalent performance and durability to rhodium in the catalytic partial oxidation of hydrocarbons, such as natural gas and other hydrocarbon fuels.

SUMMARY OF THE INVENTION

In one aspect, this invention provides for a novel bimetallic catalyst comprising a mesh substrate, which has supported thereon an alumina washcoat in which are impregnated bimetallic particles comprising rhodium and ruthenium. The rhodium is present in the bimetallic catalyst in an amount equal to or greater than about 5 weight percent and an amount equal to or less than about 54 weight percent, based on a total weight of the rhodium-ruthenium bimetallic particles. Conversely, the ruthenium is present in the bimetallic catalyst in an amount equal to or greater than about 46 weight percent and in an amount equal to or less than about 95 weight percent, based on the total weight of the rhodium-ruthenium particles.

In another aspect, this invention provides for a process of catalytic partial oxidation of a hydrocarbon, comprising contacting the hydrocarbon with an oxidant in the presence of a reforming catalyst under reaction conditions sufficient to produce a mixture of hydrogen and carbon monoxide. The reforming catalyst employed in the process of this invention comprises the aforementioned bimetallic catalyst composition, comprising the mesh substrate having supported thereon the alumina washcoat in which are impregnated bimetallic particles comprising rhodium and ruthenium in the weight percentages specified hereinabove.

The composition of this invention provides a durable bimetallic catalyst composition capable of advantageous performance in a process of catalytic partial oxidation of hydrocarbons, such as methane, to synthesis gas. In the process of this invention, hydrocarbon conversion and selectivities to hydrogen and carbon monoxide equal or exceed those achieved by a similar process utilizing a purely monometallic rhodium catalyst of the prior art. Durability is exemplified by longer catalyst lifetime and reduced catalyst degradation on exposing the bimetallic catalyst of this invention to sulfur and temperatures up to about 1,100° C. Moreover, inasmuch as the bimetallic catalyst composition of this invention substitutes a quantity of ruthenium for rhodium, the cost of the bimetallic catalyst of this invention is advantageously lower than that of a purely monometallic rhodium catalyst.

DETAILED DESCRIPTION OF THE INVENTION

The novel bimetallic catalyst composition of this invention comprises a mesh substrate having supported thereon an alumina washcoat in which are impregnated bimetallic particles comprising rhodium (Rh) and ruthenium (Ru). Typically, the composition provides for a weight ratio of rhodium to ruthenium equal to or greater than about 0.053:1.00; in one embodiment, equal to or greater than about 0.25:1.00; and in another embodiment, equal to or greater than about 0.40:1.00. The weight ratio of rhodium to ruthenium is typically equal to or less than about 1.20:1.00; and in one embodiment, equal to or less than about 0.60:1.00. On a weight percentage basis, the rhodium typically comprises equal to or greater than about 5 percent; in one embodiment, equal to or greater than about 20 percent; and in another embodiment, greater than about 29 percent, by weight, based on the total weight of the rhodium and ruthenium. Typically, the rhodium comprises equal to or less than about 54 percent; and in one embodiment, equal to or less than about 37 percent, by weight, based on the total weight of the rhodium and ruthenium. Typically, the ruthenium comprises equal to or greater than about 46 percent; and in one embodiment, equal to or greater than about 63 percent, by weight, based on the total weight of the rhodium and ruthenium. Typically, the ruthenium comprises equal to or less than about 95 percent; in one embodiment, equal to or less than about 80 percent; and in another embodiment, less than about 71 percent, by weight, based on the total weight of the rhodium and ruthenium.

In yet another embodiment, the Rh—Ru bimetallic particles have an average particle size ranging from about 5.0 to 5.4 nanometers (5.0-5.4 nm) with a standard deviation no greater than about 2.0 nm. In a preferred embodiment, the bimetallic catalyst composition contains essentially no crystalline metal oxide phase, which means that essentially no crystalline phases of ruthenium oxide(s), or rhodium oxide(s), or mixed rhodium-ruthenium oxide(s) are present; nor is any mixed rhodium-ruthenium oxide(s) incorporated into other oxide phases, as determined by X-ray crystallography.

In one exemplary embodiment, the substrate is provided as a mesh in the form of a reticulated net or reticulated screen comprising a plurality of pores or cells or channels, preferably, having an ultra-short-channel-length as noted hereinafter. In one embodiment the mesh is suitably provided in a coiled configuration of cylindrical shape having an inner diameter and a larger outer diameter such that reactants flowing there through move along a radial flow path from an inlet along the inner diameter to an outlet along the outer diameter. In another embodiment the mesh is suitably provided as one sheet or a plurality of stacked sheets with an inlet at one end of the stack and an outlet at an opposite end of the stack. In any configuration the substrate provides for a plurality of void volumes in random order, that is, empty spaces having essentially no regularity along the flow path from inlet to outlet.

The mesh is typically constructed from any material capable of withstanding the operating temperature of the reforming process. Such materials include, without limitation, metals and ceramic materials as well as cermets. Suitable metal meshes include, without limitation, those constructed from nickel-chrome-iron alloys, iron-chromium alloys, iron-chromium-aluminum alloys, and iron-chromium-nickel alloys of acceptable temperature durability. The term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of ceramic mesh comprising woven silica, both patents incorporated herein. Suitable cermets comprise combinations of the aforementioned ceramic materials with the aforementioned metallic materials.

In one exemplary embodiment, the substrate comprises an ultra-short-channel-length mesh; in a more preferred embodiment thereof a MICROLITH® brand ultra-short-channel-length mesh available from Precision Combustion, Inc., North Haven, Conn., USA. A description of the ultra-short-channel-length mesh is found, for example, in U.S. Pat. No. 5,051,241, incorporated herein by reference. Generally, the mesh comprises short channel length, low thermal mass monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In this invention the term "channel length" is taken as the distance along a pore or channel from pore inlet to pore outlet, for example, as measured from an inlet on one side of a sheet of mesh to an outlet on the opposite side of the sheet. (This measurement is not to be confused with the overall length of the flow path through the entire mesh substrate from an inlet at the inner diameter, for example, of the coiled mesh to an outlet at the outer diameter of the coiled mesh.) In another embodiment, the channel length is not longer than the diameter of the elements from which the mesh is constructed; thus, the channel length may range from 25 μm (0.001 inch) up to about 100 μm (0.004 inch) and preferably not more than about 350 μm (0.014 inch). In view of this ultra-short channel length, the contact time of reactants with the mesh and catalyst supported thereon advantageously ranges from about 5 milliseconds (5 msec) to about 350 msec.

The MICROLITH® brand ultra-short-channel-length mesh typically comprises from about 100 to about 1,000 or more flow channels per square centimeter. More specifically, each layer of mesh typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. MICROLITH® brand meshes can be manufactured in the form of woven wire screens, woven ceramic fiber screens, pressed metal or ceramic screens, or they can be manufactured by perforation and expansion of a thin metal sheet as disclosed in U.S. Pat. No. 6,156,444, incorporated herein by reference; or alternatively manufactured by 3-D printing or by a lost polymer skeleton method.

The MICROLITH® brand mesh having the ultra-short-channel-length facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh described herein avoids boundary layer buildup. Since heat and mass transfer coefficients depend on boundary layer thickness, avoiding boundary layer buildup enhances transport properties. Employing the ultra-short-channel-length mesh, such as the MICROLITH® brand thereof, to control and limit the development of a boundary layer of a fluid passing there through is described in U.S. Pat.

No. 7,504,047, which is a Continuation-In-Part of U.S. Pat. No. 6,746,657 to Castaldi, both patents incorporated herein by reference. The MICROLITH® brand mesh of ultra-short-channel-length also advantageously provides for a light-weight portable size, a high throughput, a high one-pass yield of hydrogen-containing partial oxidation product, a low yield of coke and coke precursors, and an acceptably long catalyst lifetime, as compared with alternative substrates including ceramic monolith and pelleted substrates.

In another exemplary embodiment, the mesh is constructed of an analogous porous structure of metal, ceramic, or other porous structured substrate material having an ultra-short-channel length, comprising an interconnected network of solid struts defining a plurality of pores of an open-cell configuration. The pores can have any shape or diameter; but typically, a number of pores that subtend one inch designate a "pore size," which for most purposes ranges from about 5 to about 80 pores per inch. The relative density of such structures, taken as the density of the structure divided by the density of solid parent material of the struts, typically ranges from about 2 to about 15 percent. Manufactured or structured ultra-short-channel-length substrates are commercially available in a variety of materials capable of withstanding the operating temperature of the reformer.

Generally, the bimetallic catalyst of this invention comprising rhodium and ruthenium is prepared by impregnating one or more solutions or slurries containing a soluble salt of rhodium and a soluble salt of ruthenium onto the mesh or porous structured substrate, which itself has been pretreated with an alumina washcoat. Suitable salts of rhodium and ruthenium include their chlorides, bromides, nitrates, sulfates, acetates, higher carboxylates, and any other commercially available salts of rhodium and ruthenium. Water is a preferred solvent, although alcohols are equally suitable, as well as mixtures of water with alcohols, surfactants, soluble polymers or other organic compounds, or wetting agents. The quantity of each rhodium-containing and/or ruthenium-containing slurry employed in the impregnation process is that quantity sufficient to provide for the desired ratio of rhodium to ruthenium in the as-prepared catalyst, notably, within the compositional ranges noted hereinbefore. After impregnation with the metal salts, the composite comprising the rhodium and ruthenium salts and the mesh or porous structured substrate is dried to remove the solvent and then calcined in an oven at a temperature sufficient to remove any chloride, sulfide, bromide, nitrate, or hydrocarbons that might be present. Suitably the calcination temperature is greater than about 500° C., preferably, greater than about 530° C. Suitably, the calcination temperature is less than about 700° C., preferably, less than about 580° C. Pretreatment of the substrate with an alumina washcoat is well known in the art. Moreover, alumina washcoated substrates including alumina washcoated meshes suitable for this invention are commercially available.

In another aspect, this invention provides for a process of catalytic partial oxidation of a hydrocarbon, comprising contacting the hydrocarbon with an oxidant in the presence of a reforming catalyst under reaction conditions sufficient to produce a mixture of synthesis gas, that is, hydrogen and carbon monoxide. The reforming catalyst employed in the process of this invention comprises the aforementioned bimetallic catalyst composition, comprising the mesh substrate having supported thereon the alumina washcoat in which are impregnated bimetallic particles comprising rhodium and ruthenium in the relative weight ratios described hereinbefore.

Any hydrocarbon or mixture of hydrocarbons that exist as a gas or liquid at ambient temperature and ambient pressure is suitably employed in the CPOX reforming process of this invention. For purposes of this invention, ambient temperature is taken as ranging from about −20° C. to about +37° C. at a pressure ranging from about 0.8 atm absolute (81 kPa) to about 1.1 atm absolute (111 kPa). The skilled person will understand that the term "hydrocarbon" refers to organic compounds consisting essentially of carbon and hydrogen atoms. Illustrative examples of such gaseous hydrocarbons include $C_{1-4}$ hydrocarbons including methane, natural gas, ethane, ethylene, propane, propylene, butane, butylene, and mixtures thereof. Methane and natural gas are preferred gaseous hydrocarbons. Liquid hydrocarbons include, without limitation, gasoline, kerosene, diesel, naphthas, and other gas oils.

The oxidant employed in the process of this invention is selected from any oxidant capable of converting the hydrocarbon predominantly to one or more partially-oxidized chemical products. The skilled person will recognize that partially-oxidized chemical products, such as carbon monoxide and hydrogen, are capable of further oxidative conversion, respectively to carbon dioxide and water. In contrast, fully oxidized products, such as water and carbon dioxide, are incapable of further oxidative conversion. Suitable oxidants include without limitation essentially pure oxygen, mixtures of oxygen and nitrogen including air, and mixtures of oxygen and an inert gas, such as helium or argon. Preferably, the oxidant is air.

A quantity of oxidant relative to a quantity of hydrocarbon fuel fed to the reforming process is suitably described by an O/C ratio, wherein "O" represents atoms of oxygen in the oxidant and "C" represents atoms of carbon in the hydrocarbon fuel. Preferably, the O/C ratio ranges between about 0.7/1 and about 1.3/1.

The process of this invention is typically conducted as a dry catalytic partial oxidation (dry CPOX), meaning that the process is typically conducted in the absence of co-fed water or steam. Water is not necessarily excluded, however; and in certain circumstances may be beneficial in limited quantity for increasing conversion of the hydrocarbon. If water or steam is co-fed to the process, the water or steam is typically co-fed with the oxidant or fed via a separate inlet to the process. Accordingly, a steam to carbon (St/C) ratio, given as moles of co-fed water or steam relative to moles of carbon in the hydrocarbon fuel, ranges usually from 0 to less than about 1.0/1 or occasionally up to 2/1 or even 3/1. Employing water as a co-feed with the hydrocarbon and oxidant is referred to as 'autothermal reforming'.

Within a process reactor, the hydrocarbon fuel is contacted with the oxidant in the presence of the reforming catalyst under process conditions sufficient to convert the hydrocarbon fuel predominantly to hydrogen and carbon monoxide. Secondary products include lesser amounts of carbon dioxide and water. The process is typically conducted at a reaction temperature greater than about 650° C., and in one embodiment, greater than about 850° C. The reaction temperature is typically less than about 1,200° C., and in one embodiment, less than about 1,000° C. Pressure within the reactor is advantageously maintained in a range from about 14.7 psia (101 kPa) to about 100 psia (690); but other pressures may be equally suitable. Advantageously, the combined streams of hydrocarbon fuel and oxidant, and optional water or steam if any, are fed to the process typically in a total gas hourly space velocity equal to or greater than about 20,000 liters per liter catalyst bed per hour (≥20,000 $hr^{-1}$), and in one embodiment, greater than about 100,000 hr$^{-1}$, measured at ambient temperature and pressure, taken for these purposes as about 21° C. and about 1 atm (101 kPa). Typically, the total gas hourly space velocity is less than about 10,000,000 hr$^{-1}$, and in one embodiment, less than about 1,600,000 hr$^{-1}$, measured at about 21° C. and about 1 atm (101 kPa).

EMBODIMENTS

Example 1 (E-1)

Figure 7:
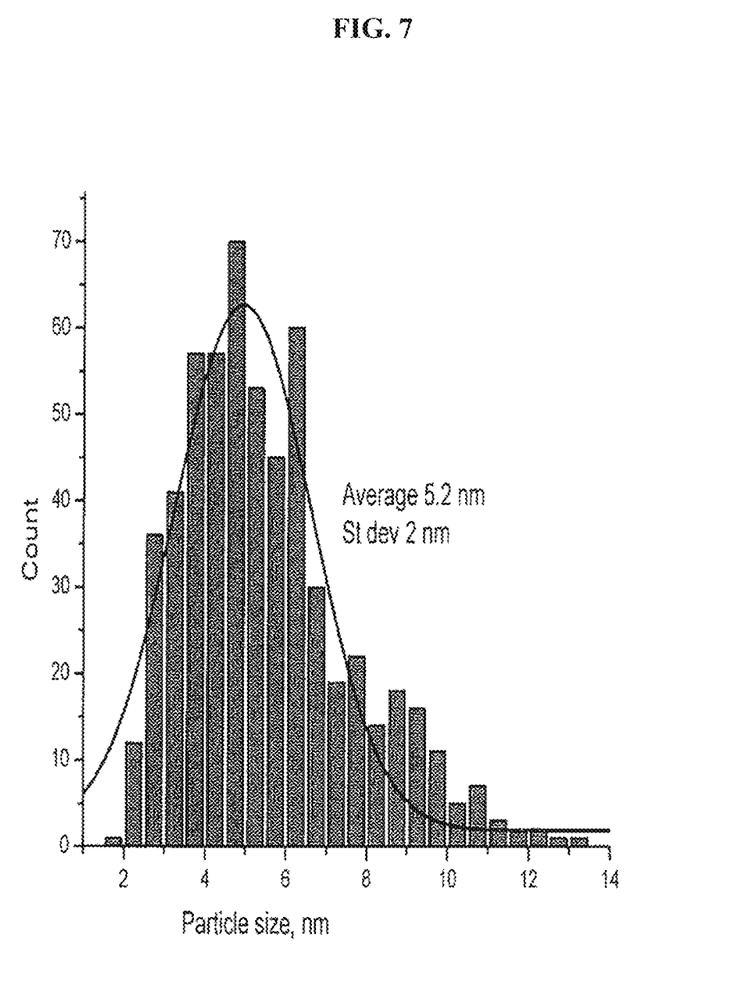
FIG. 7 depicts a graph plotting particle count versus particle size for an embodiment of the Rh—Ru bimetallic catalyst of this invention.

A catalyst composition was prepared by impregnating a mixture containing an aqueous precursor solution of rhodium chloride hydrate (Sigma Aldrich) and an aqueous precursor solution of ruthenium chloride hydrate (Sigma Aldrich) onto a MICROLITH® brand ultra-short channel length metal mesh substrate washcoated with alumina (Precision Combustion, Inc.). The aqueous precursor solutions were each individually prepared by adding an amount of the relevant chloride salt to water such that the amount of relevant metal in solution was 5 weight percent. Then, the mixture was prepared by combining the two aqueous precursor solutions such that the total loading of the two metals (Rh, Ru) on the mesh substrate met a predetermined target loading, in this example, 1 mg/inch$^2$ of rhodium and 1 mg/inch$^2$ of ruthenium. This translated into 20 mg of each precursor solution per square inch of mesh substrate. The mixture was deposited onto the mesh substrate by the incipient wetness impregnation technique. After impregnation, the mesh was dried at 100° C., followed by calcination in air at 550° C. for 5 hours in an oven to ensure decomposition of the chloride. The resulting catalyst composition comprising rhodium (1 mg/inch$^2$) and ruthenium (1 mg/inch$^2$) on the alumina wash-coated ultra-short-channel-length metal mesh substrate was determined to contain bimetallic particles of Rh and Ru having an average particle size of 5.2 nm with a standard deviation of 2 nm, as seen in FIG. 7.

Figure 1:
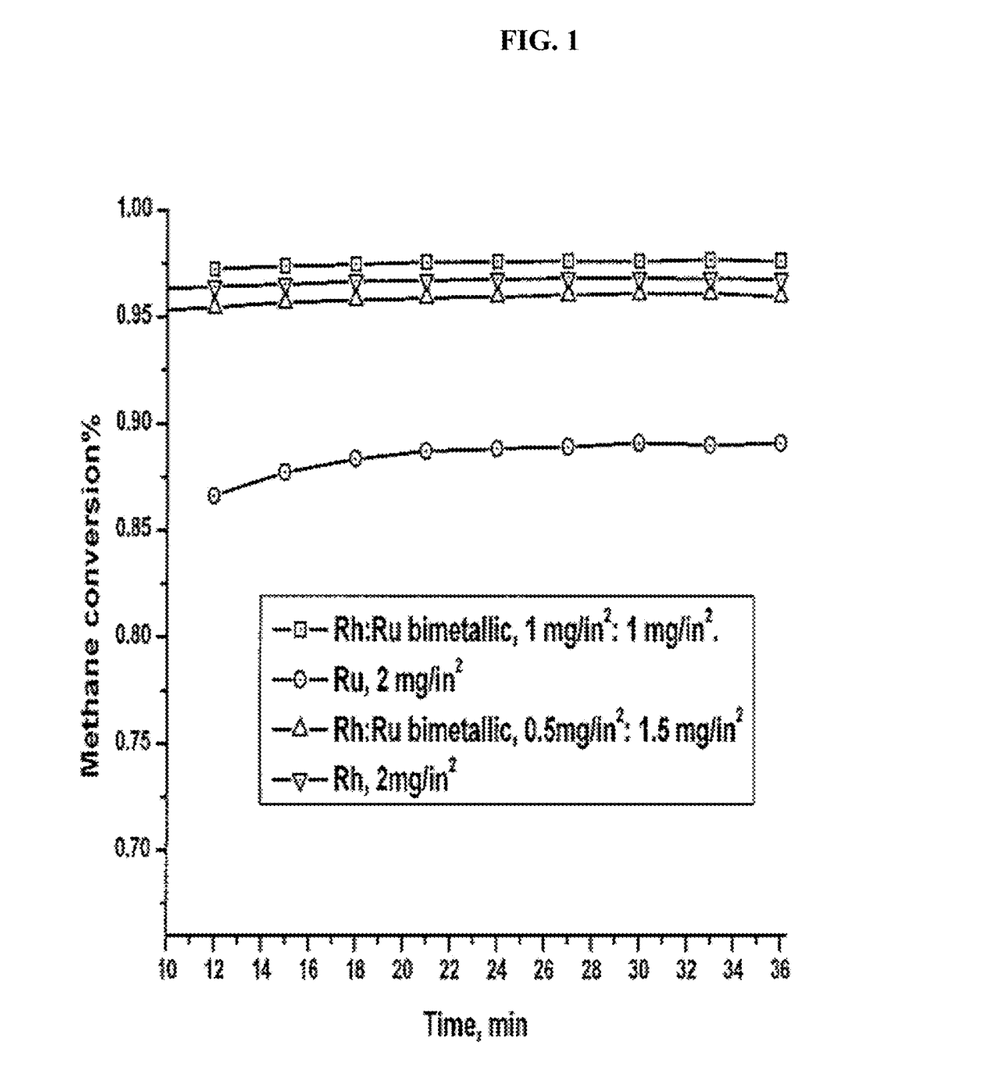
FIG. 1 depicts a graph plotting methane conversion versus time for embodiments of the process of this invention employing the Rh—Ru bimetallic catalyst, as compared with similar processes using Rh monometallic and Ru monometallic catalysts.
Figure 2:
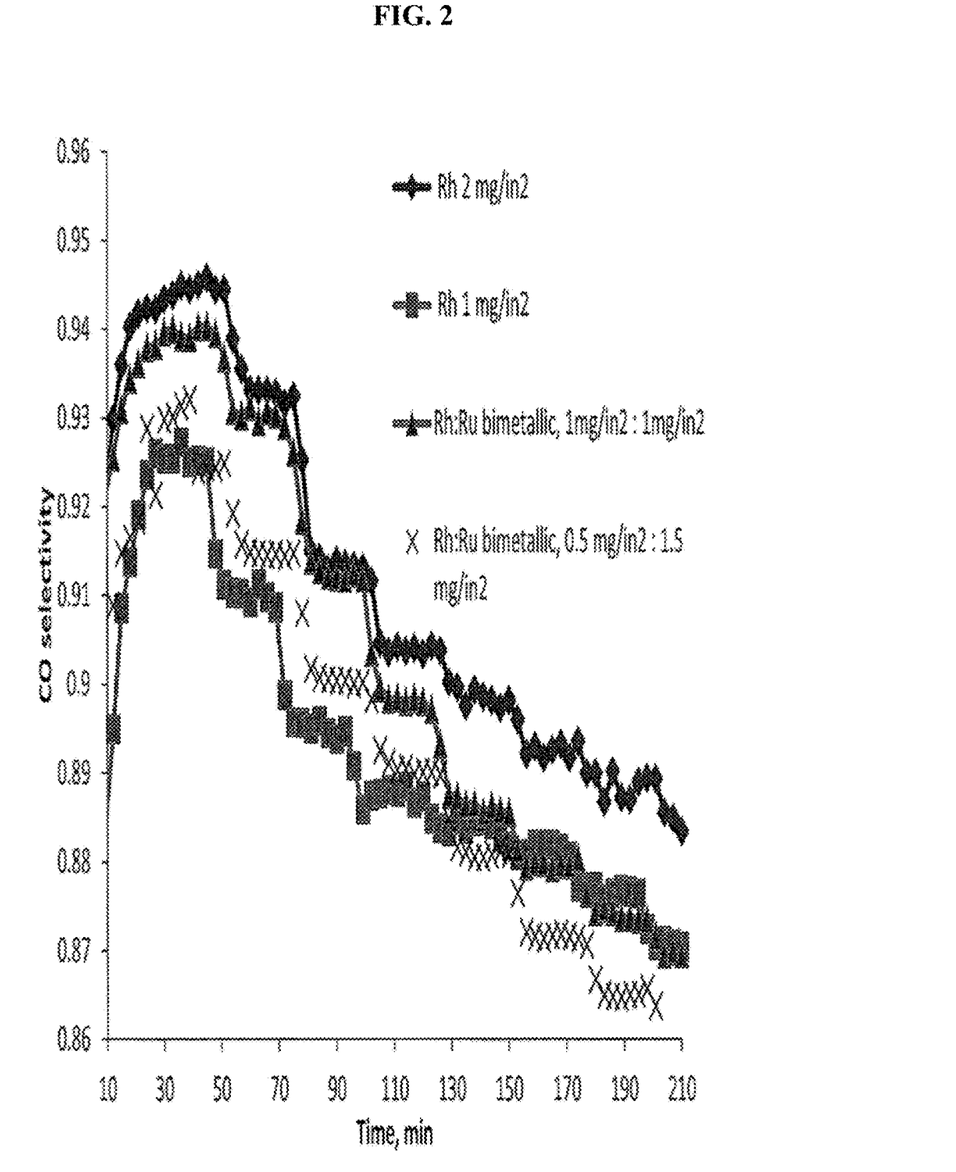
FIG. 2 depicts a graph plotting carbon monoxide selectivity as a function of time for embodiments of the process of this invention, as compared with similar processes using Rh and Ru monometallic catalysts.
Figure 3:
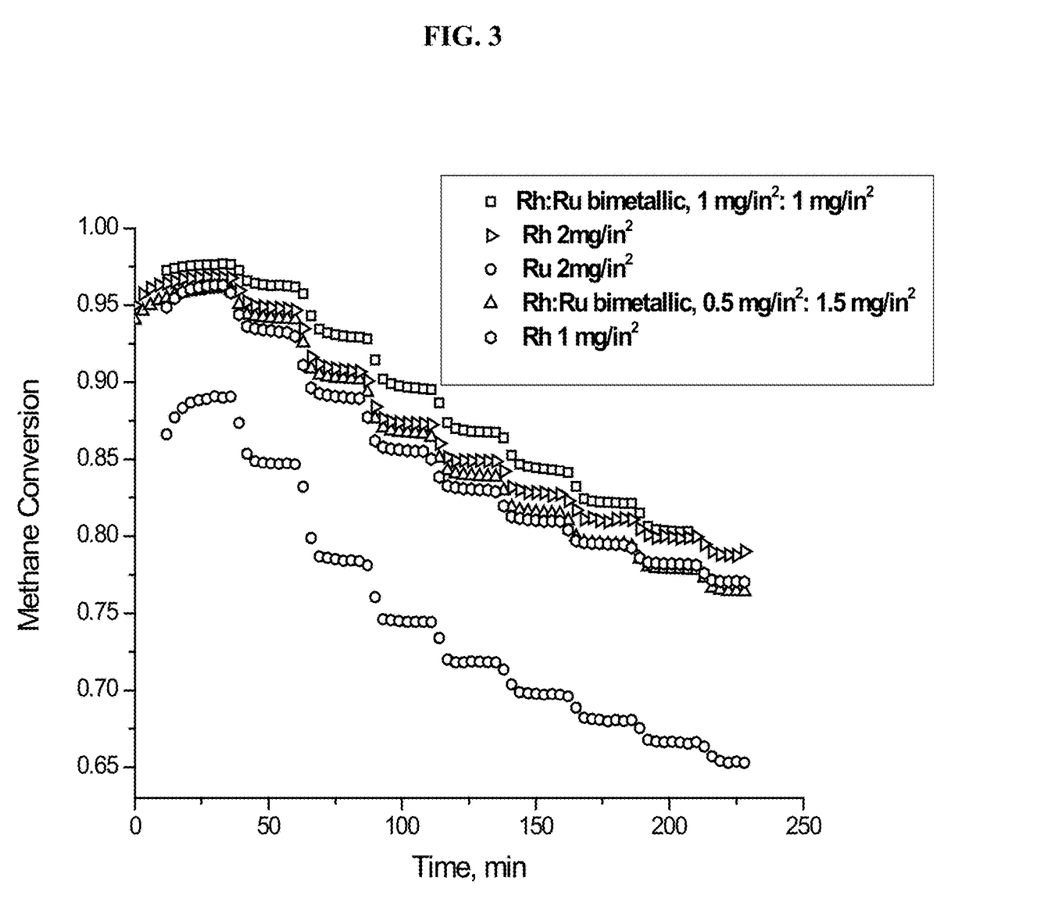
FIG. 3 depicts a graph plotting methane conversion versus time for embodiments of the process of this invention employing the Rh—Ru bimetallic catalyst, as compared with processes using Rh and Ru monometallic catalysts.
Figure 4:
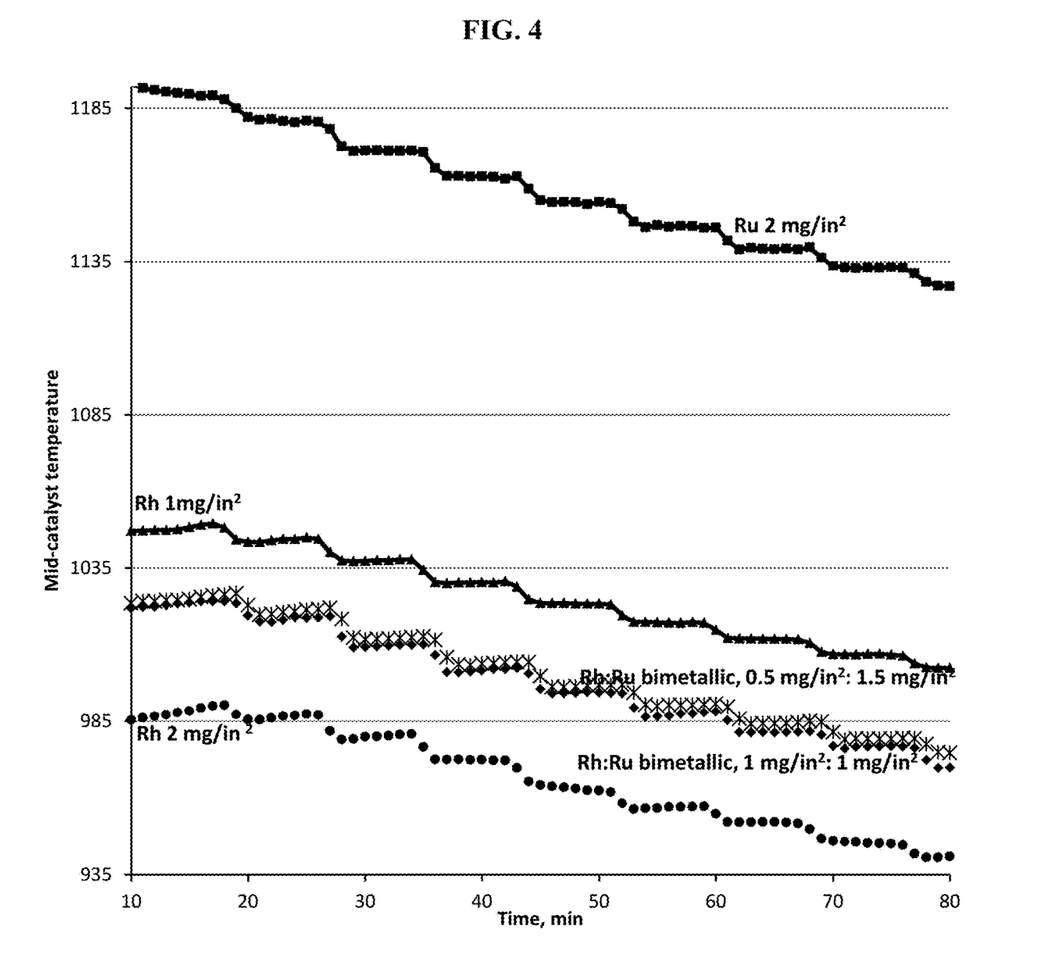
FIG. 4 depicts a graph plotting mid-catalyst temperature versus time for embodiments of the process of this invention employing the Rh—Ru bimetallic catalyst, as compared with processes using Rh and Ru monometallic catalysts.
Figure 5:
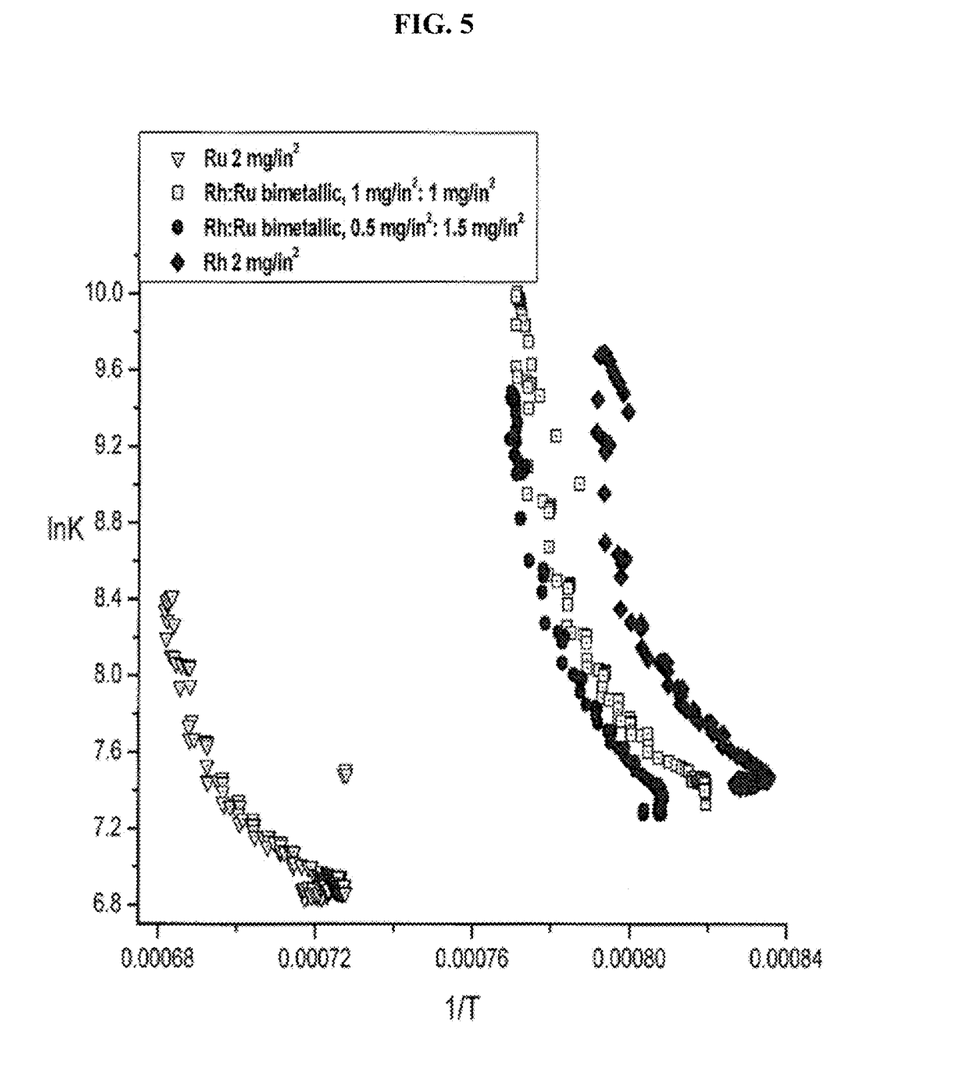
FIG. 5 depicts an Arrhenius graph plotting log reaction rate (ln K) versus inverse temperature (1/T) for embodiments of the process of this invention employing the Rh—Ru bimetallic catalyst, as compared with processes using Rh and Ru monometallic catalysts.
Figure 6:
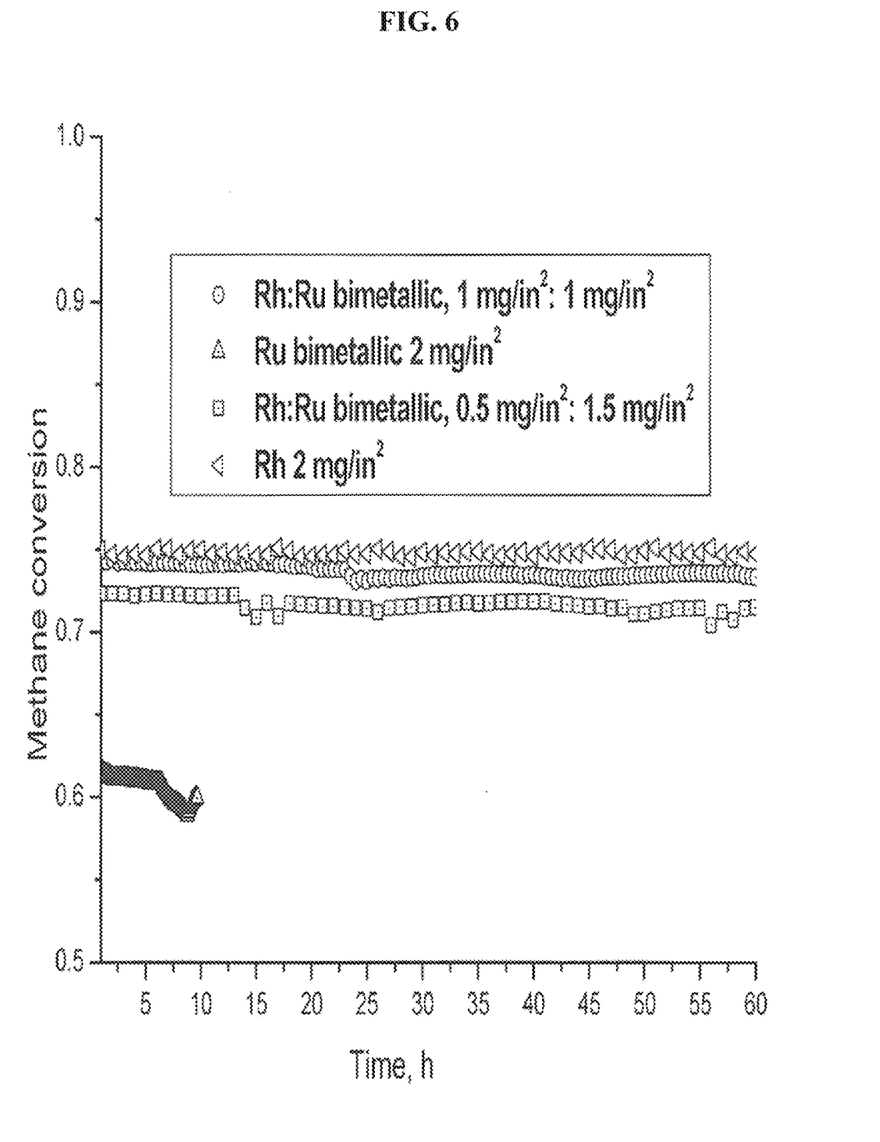
FIG. 6 depicts a graph of methane conversion versus time for embodiments of the process of this invention employing the Rh—Ru bimetallic catalyst, as compared with processes using Rh and Ru monometallic catalysts.

The catalyst composition so prepared was cut into twelve (12) screens (1 inch dia.; 2.54 cm dia.) and loaded into a cylindrical stainless steel tube, which was then fitted on one end with an inlet for feeding methane and oxygen and fitted on the other end with an exit port connected to a gas chromatograph. The reaction zone totaled 0.24 cm in length. A flow of methane and oxygen in an atomic O/C ratio of 1.3 was passed over the catalyst and reacted under the following process conditions: temperature varied with time from about 950° C. to about 1,000° C.; pressure, 14 psia (97 kPa); gas hourly space velocity (GHSV), 1.6×10$^6$ hr$^{-1}$. FIG. 1 depicts a graph of methane conversion (mole %) as a function of time. FIG. 2 presents a graph of carbon monoxide selectivity as a function of time. FIG. 3 presents a graph of methane conversion (mole %) as a function of an extended run time. FIG. 4 presents a graph of mid-catalyst temperature as a function of time, where the term "mid-catalyst temperature" refers to the temperature of the catalyst bed at the mid-point of the flow path from inlet to outlet, with regards to the volume occupied by the catalyst. FIG. 5 presents a graph of "log rate constant" as a function of inverse temperature. FIG. 6 presents a graph of methane conversion as a function of run time out to 60 hours. FIG. 7 presents a graph of particle count versus particle size for the catalyst of this example.

Example 2 (E-2)

Example 1 was repeated, with the exception that the bimetallic catalyst contained 0.5 mg/inch$^2$ rhodium and 1.5 mg/inch$^2$ ruthenium. FIGS. 1-6 present process data for this example analogous to the data described for Example E-1.

Comparative Experiment 1 (Ce-1)

Example 1 was repeated with the exception that a monometallic catalyst was prepared and employed by impregnating rhodium (2 mg/inch$^2$) solely on the metal mesh substrate. No solution of ruthenium chloride was impregnated. For comparative purposes, FIGS. 1-6 present process data for this example analogous to the data described for Example E-1.

Comparative Experiment 2 (Ce-2)

Example 1 was repeated with the exception that a monometallic catalyst was prepared and employed containing ruthenium (2 mg/inch$^2$) solely on the metal mesh substrate. No solution of rhodium chloride was impregnated. For comparative purposes, FIGS. 1 and 3-6 plot process data for this example analogous to the data described for Example E-1.

Comparative Experiment 3 (Ce-3)

Example 1 was repeated with the exception that a monometallic catalyst was prepared and employed by impregnating rhodium (1 mg/inch$^2$) solely on the metal mesh substrate. No solution of ruthenium chloride was impregnated. For comparative purposes, FIGS. 2, 3 and 4 present process data for this example analogous to the data described for Example E-1.

When Examples E-1 and E-2 were compared with Comparative Experiments CE-1, CE-2 and CE-3 in terms of methane conversion (FIGS. 1, 3, and 6), it was seen that the bimetallic catalysts of the invention E-1 and E-2 performed significantly better than the monometallic ruthenium catalyst CE-2. Moreover, as seen in FIGS. 1-6, the bimetallic catalysts of the invention E-1 and E-2 performed equally well as compared with the more expensive monometallic rhodium catalysts CE-1 and CE-3. In fact, the bimetallic catalyst of example E-1 containing equal quantities of rhodium and ruthenium (1 mg/inch$^2$ Rh, 1 mg/inch$^2$ Ru) outperformed the rhodium catalysts of comparative experiment CE-1 and CE-3.

As seen in FIG. 4, the comparative monometallic ruthenium catalyst CE-2 had the worst temperature profile by running at the highest temperature. The comparative monometallic rhodium catalyst CE-1 also ran significantly hotter than both bimetallic Rh—Ru catalysts E-1 and E-2 of this invention. Lower temperatures, as exhibited by the bimetallic catalysts of this invention, correlate with increased durability, as seen in FIG. 6.

As seen in FIG. 5, the rate of reaction exhibited by the bimetallic catalysts E-1 and E-2 of the invention greatly exceed the rate of reaction exhibited by the comparative monometallic ruthenium catalyst CE-2 and compare favorably with the rate of reaction exhibited by the comparative monometallic rhodium catalysts CE-1 and CE-3.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A process of catalytic partial oxidation of a hydrocarbon, comprising contacting the hydrocarbon with an oxidant in the presence of a reforming catalyst under reaction conditions sufficient to produce a mixture of hydrogen and carbon monoxide; the reforming catalyst comprising a mesh substrate having supported thereon an alumina washcoat, on which are impregnated bimetallic particles comprising rhodium and ruthenium; the rhodium being present in an amount equal to or greater than about 5 percent and an amount equal to or less than about 54 percent, by weight, based on a total weight of the rhodium-ruthenium bimetallic particles; the ruthenium being present in an amount equal to or greater than about 46 percent and in an amount equal to or less than about 95 percent, by weight, based on the total weight of the rhodium-ruthenium bimetallic particles, wherein the rhodium and ruthenium occur in bimetallic particles having an average particle size ranging from 5.0 to 5.4 nanometers with a standard deviation no greater than 2.0 nm.

2. The process of claim 1 wherein the hydrocarbon is a gaseous hydrocarbon selected from $C_{1-4}$ gaseous hydrocarbons or a mixture thereof; or wherein the hydrocarbon is a liquid hydrocarbon selected from gasoline, kerosene, diesel, naphthas, gas oils, and mixtures thereof.

3. The process of claim 2 wherein the gaseous hydrocarbon is natural gas or methane.

4. The process of claim 1 wherein the oxidant is selected from oxygen, a mixture of oxygen and nitrogen, or a mixture of oxygen and an inert gas.

5. The process of claim 1 wherein a ratio of oxygen atoms in the oxidant to carbon atoms in the hydrocarbon ranges from 0.8:1 to 1.3:1.

6. The process of claim 1 wherein the bimetallic catalyst composition contains essentially no crystalline phase of rhodium oxide, ruthenium oxide, or mixed rhodium-ruthenium oxides.

7. The process of claim 1 wherein the mesh substrate is constructed from a metal or ceramic material.

8. The process of claim 1 wherein the mesh substrate has an ultra-short-channel-length ranging from 25 microns (μm) (0.001 inch) to 500 μm (0.02 inch).

9. The process of claim 8 wherein the mesh substrate comprises from 100 to 1,000 or more flow channels per square centimeter.

10. The process of claim 8 wherein the mesh substrate is configured with a plurality of channels or pores having a diameter ranging from about 0.25 millimeters (mm) to about 1.0 mm, with a void space greater than about 60 percent and up to about 80 percent.

11. The process of claim 1 wherein the mesh substrate comprises a porous structured material having from 5 to 80 pores per inch, and a relative density ranging from 2 to 15 percent, wherein relative density is taken as the density of the structured material divided by a density of solid parent material from which the structured material is constructed.

12. The process of claim 1 wherein the process is conducted at a temperature ranging from 650° C. to 1,200° C. and a pressure ranging from 14.7 psia to 100 psia.

13. The process of claim 1 wherein the process is conducted at a gas hourly space velocity ranging from greater than 20,000 $hr^{-1}$ to less than 1,600,000 $hr^{-1}$.

* * * * *